March 5, 1935. R. L. STOKELY Re. 19,491

TELEPHONE EXCHANGE SYSTEM

Original Filed Sept. 18. 1930 2 Sheets-Sheet 1

INVENTOR
R. L. STOKELY
BY
M. P. McKenney
ATTORNEY

TELEPHONE EXCHANGE SYSTEM

Original Filed Sept. 18, 1930 2 Sheets-Sheet 2

INVENTOR
R. L. STOKELY
BY M. P. McKenney
ATTORNEY

Reissued Mar. 5, 1935 Re. 19,491

UNITED STATES PATENT OFFICE 19,491

TELEPHONE EXCHANGE SYSTEM

Ray L. Stokely, Floral Park, N. Y., assignor to Bell Telephone Laboratories, Incorporated, New York, N. Y., a corporation of New York Original No. 1,859,941, dated May 24, 1932, Serial No. 482,699, September 18, 1930. Application for reissue March 2, 1934, Serial No. 713,763

27 Claims. (Cl. 179—7.1)

This invention relates to telephone exchange systems and more particularly to systems arranged to serve message rate subscribers.

The object of this invention is to provide a reliable arrangement for variably charging a calling subscriber depending upon the destination and duration of a call.

According to this invention a timing and charging mechanism, individual to the trunk conductors which connect a line-finder switch with a first selector switch in a step-by-step system, is effective to variably operate the message register of a calling line in accordance with the destination and duration of a call. On local or other minimum rate calls the register is operated once for an initial unit period of conversation and once for each additional unit period of conversation. On interoffice calls for which a higher charge is to be made, the outgoing trunk repeater is effective immediately after its seizure to vary the timing and charging mechanism in order that the number of meter operations and the length of the unit periods of conversation will correspond to the destination of the call.

A further feature of the invention resides in arranging an outgoing trunk repeater circuit so that immediately after its seizure the sleeve conductor is connected to a booster-battery so as to transmit a current impulse to the timing and charging mechanism associated with the trunk between the line-finder and first selector. The duration of the connection to the booster-battery and the resulting impulse indicates the destination of the call and controls the timing and charging mechanism so that the number of meter operations and the length of the unit periods of conversation will correspond to the destination of the call. The timing and charging mechanism is arranged so that there is no possibility of overcharging in case the sleeve terminal of the repeater is tested by a hunting selector during the transmission of the impulse.

One embodiment of this invention is shown diagrammatically in the drawings and the operation of the system therein disclosed will be explained in detail. It is understood, however, that various modifications and other applications of the invention will readily occur to those skilled in the art.

Referring to the drawings, Fig. 1 shows a calling subscriber's station A, a line finder LF, a selector S1, and a trunk circuit T which is individual to and permanently associated with the line finder LF and selector S1;

Figs. 3, 4, 5 and 6 show various schemes for connecting the terminals of one of the banks of the timing switch of the trunk T. By use of a particular one of these wiring arrangements the system shown in Figs. 1 and 2 may be adapted for effecting the proper message charges in a particular area.

Figure 1:
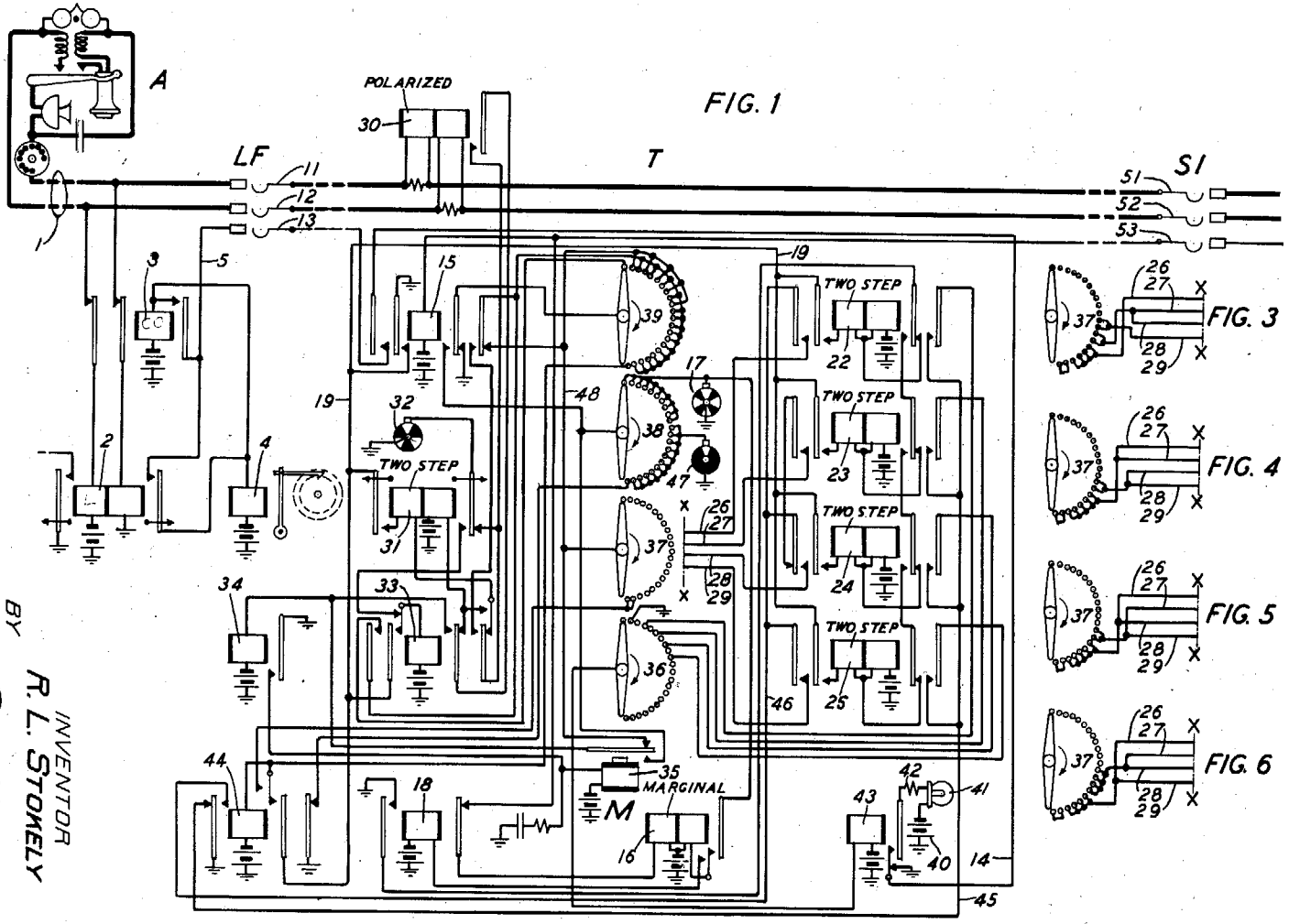
Figure 2:
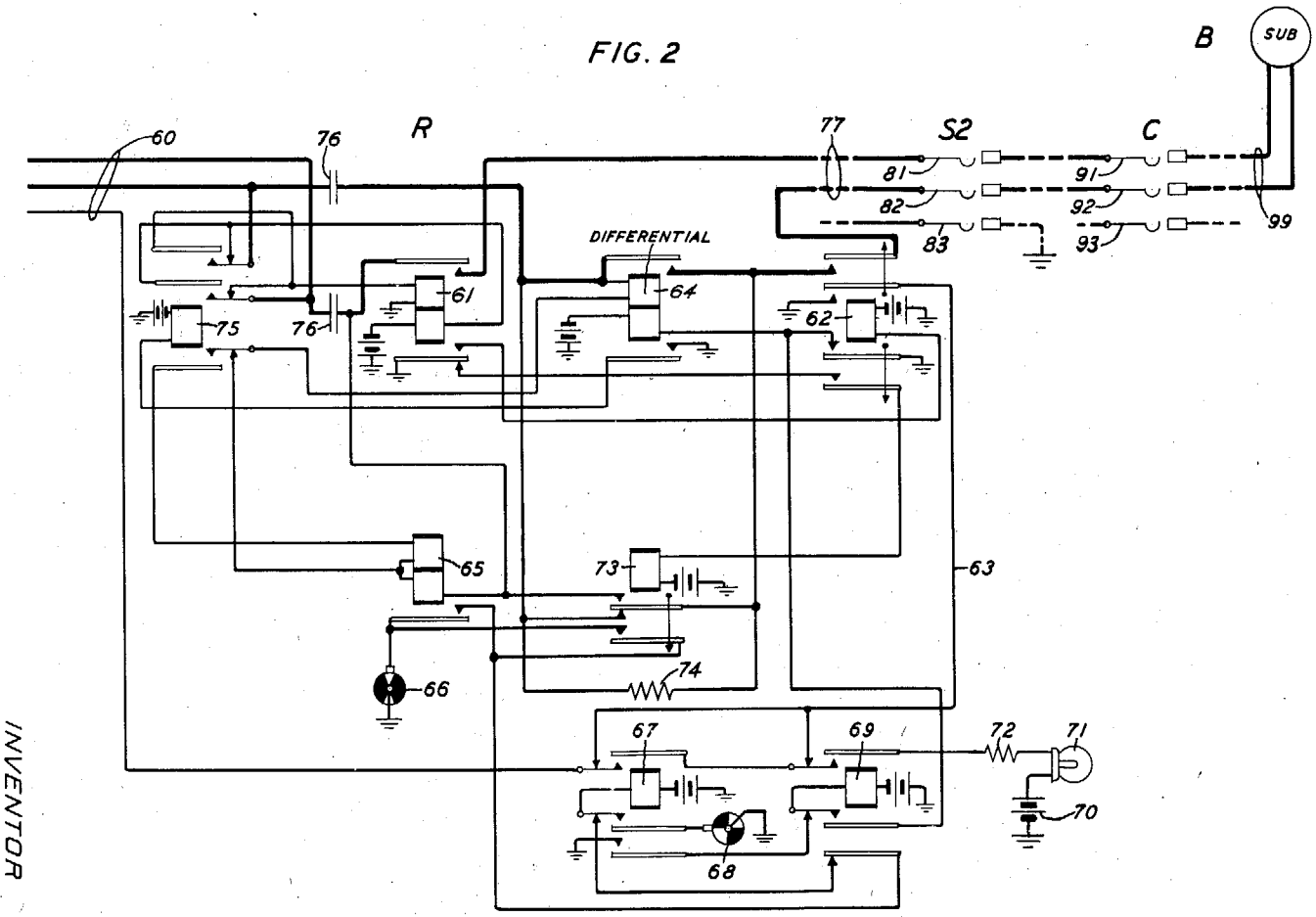
Fig. 2 shows a repeater R, an incoming selector S2, a connector C and a called subscriber's station B.

The line finder switch LF, which may be of the well known Strowger type, is represented schematically by the brushes 11, 12 and 13 and the terminals with which they are associated. The broken lines represent portions of the line finder circuit which have been omitted because they are not involved in the description of this invention. For a detailed description of the operation of the switch LF reference may be had to Patent 1,711,682 issued to H. Hovland, May 7, 1929; the multiple brushes 11, 12 and 13 correspond to one of the two sets of brushes shown in the Hovland patent.

The selector switches S1 and S2 and the connector switch C may also be of the Strowger type. These switches are represented schematically by the brushes 51, 52 and 53, the brushes 81, 82 and 83, and the brushes 91, 92 and 93, respectively and by the associated sets of terminals. The broken lines represent portions of the circuits of these switches which have been omitted. For a complete description of the operation of these switches reference may be had to pages 53 to 67 inclusive of the second edition of "Automatic Telephony" by Smith and Campbell.

The trunk circuit T comprises the usual polarized supervisory relay whose windings are in series with the talking conductors of the trunk, zone relays for registering the destination of the call, and a charging switch M for measuring the unit periods of conversation and operating the calling subscriber's message register. The supervisory relay is not operated by the current flowing through its windings during the establishment of the connection but is operated when the current through its windings is reversed in consequence of the answer of the called subscriber.

The repeater circuit R is arranged to repeat dial impulses over the outgoing trunk in the usual manner. Upon seizure, the repeater transmits a booster-battery impulse over the sleeve conductor to the trunk circuit associated with the selector by which the repeater is seized. The duration of this impulse indicates the zone in which the outgoing trunk terminates.

Upon receipt of a booster-battery impulse by the trunk T, the corresponding zone relays are operated to register the zone in which the called station is located. When the polarized supervisory relay operates in consequence of the answer of the called subscriber, the charging switch M closes the circuit for operating the calling subscriber's register one, two, three, four, or five times, as controlled by the zone relays, as a charge for the initial unit period of conversation which the switch M proceeds to count off under control of a properly timed interrupter. If the conversation continues beyond this measured unit period, the calling subscriber's register is again operated under control of the zone relays and switch M as the charge for an additional period of conversation. The charge for additional periods of conversation may or may not consist of the same number of meter operations as the initial charge, and the duration of the additional unit periods may or may not be equal to the duration of the initial period of conversation.

The operation of the system shown in the drawings will now be described in detail. Assume a call to have been originated at station A, that station B is the called station, that the line finder LF has extended the line 1 of the calling station through brushes 11, 12 and 13 over the talking conductors of trunk T to the selector S1, that the selector S1 has been operated in response to the dialing of the first digit of the called station's number to select a group of trunks, and that the selector has automatically selected an idle trunk 60 in that group. The conductors of the selected trunk 60 connect to the repeater R which is arranged to repeat the impulses created by the dialing of the remaining digits of the called station's number, over the outgoing interoffice trunk conductors 77, to an incoming selector in the distant office to which these conductors are connected, and to a connector which has access to the line of the called station. As soon as the talking conductors of trunk T are extended by selector S1 to the repeater R, the line relay 61 of the repeater is energized in a circuit which may be traced from battery through the lower winding of relay 61, upper outer back contact of relay 75, ring conductor of trunk 60, brush 52 of selector S1, right hand winding of the polarized supervisory relay 30, brush 12 and ring terminal of line 1, over line 1 and through the subscriber's set at station A, tip terminal of line 1 and brush 11, left hand winding of relay 30, brush 51 of selector S1, tip conductor of trunk 60, inner upper back contact of relay 75, and through the upper winding of relay 61, to ground. Relay 61 operates thereby closing a circuit through the winding of slow-to-release relay 62. Relay 62 operates, thereby connecting ground through its inner upper front contact, over conductor 63, through the upper back contact of relay 67, over the sleeve conductor of trunk 60, brush 53 of selector S1, to the winding of relay 15 and through the back contact of relay 18, to the left hand winding of relay 16. Relay 15 operates, but relay 16 is marginal and does not operate at this time. Relay 15 connects the ground at the back contact of relay 43, over conductor 14, to the sleeve conductor of line finder LF to hold the cut-off relay 3 until the connection is released. The cut-off relay 3 was previously operated in the usual manner when the brushes of line finder LF found the terminals of line 1. Relay 15 also connects ground, through its inner left hand front contact, to conductor 19. The selector S1 is held operated, by the ground on the incoming sleeve conductor of repeater R, in the usual manner.

The aforementioned operation of relay 62 of repeater R is also effective to close an obvious circuit through the lower winding of relay 64, and to close a loop across the outgoing conductors of trunk 77 so as to operate the line-relay (not shown) of the incoming selector to which these conductors are connected in the office of the called station B. This loop may be traced from the ring conductor of trunk 77, through the outer upper front contact of relay 62, back contact of relay 73, upper winding of relay 64, lower back contact of relay 75, lower winding of relay 65, upper front contact of relay 61, to the tip conductor of trunk 77. The current through the lower winding of relay 64 electro-magnetically opposes the current flowing through the upper winding of this relay until the answer of the called subscriber causes the current through the upper winding to be reversed. Therefore, relay 64 does not operate upon closure of the aforementioned loop; but relay 65 is operated by the energization of its lower winding. Relay 65 connects the brush of interrupter 66 through the outer lower back contact of relay 69, and lower back contact of relay 67, to the winding of relay 67. The pick-up interrupter 66 is arranged to connect its brush to ground once every two seconds, the connection being opened approximately one tenth of a second after its closure. As soon after relay 65 operates as the brush of interrupter 66 is connected to ground, relay 67 operates. Relay 67 transfers its winding through the front contact of its lower make-before-break springs to the brush of interrupter 68, and closes an obvious circuit for operating relay 69. Interrupter 68 is arranged to hold relay 67 operated for an interval which is indicative of the charging rate for the use of the interoffice trunk with which this repeater is associated. For instance, repeaters associated with trunks to an office in zone 2 are equipped with an interrupter which holds relay 67 operated for four tenths of a second; repeaters associated with trunks to an office in zone 3 are equipped with an interrupter which holds relay 67 operated for eight tenths of a second; repeaters associated with trunks to an office in zone 4 are equipped with an interrupter which holds relay 67 operated for one and two tenths seconds; and repeaters associated with trunks to an office in zone 5 are equipped with an interrupter which holds relay 67 operated for one and six tenths seconds. Of course, if the call is to an office in zone 1, a repeater may or may not be included in the connection; if a repeater is used, it is not arranged to transmit a booster-battery impulse to the charging trunk since the calling station is to be charged at the minimum rate.

Relay 69 locks through the front contact of its make-before-break springs, to ground at the inner lower front contact of relay 62; so that relay 67 cannot operate a second time after the circuit through its winding is opened by interrupter 68. During the time that relay 67 remains operated, after relay 69 has operated, the sleeve conductor of trunk 60 is transferred from the ground on conductor 63, through the upper front contacts of relays 67 and 69, and through resistance 72 and lamp 71, to the booster-battery 70 thereby causing an increase in the current through the windings of relays 15 and 16 of trunk T. Relay 15 is thus held operated and relay 16 is operated one or more times depending upon the duration of the connection to battery 70. When relay 67 releases, due to the opening of the connection to ground at interrupter 68, the sleeve conductor of trunk 60 is again connected through the upper back contact of relay 67, to ground over conductor 63.

The aforementioned operations of relay 16 of trunk T, upon extension of the calling line to repeater R, are effective to operate that combination of zone relays 22, 23, 24 and 25 which corresponds to the length of booster-battery impulse received from the repeater R. When operated, relay 16 locks through its right-hand winding and outer front contact under control of interrupter 17. Interrupter 17 is arranged to connect its brush to ground once every four tenths of a second, each period of closure enduring for two tenths of a second. Interrupters 17 and 66 are so arranged, with respect to each other, that the closed period of interrupter 66 occurs at the same time as one of the open periods of interrupter 17. Relay 16 also connects interrupter 17 to the winding of relay 18, so that relay 18 is operated as long as relay 16 is held by interrupter 17. Relay 18 disconnects the left-hand winding of relay 16 from the outgoing sleeve conductor of trunk T so that relays 16 and 18 are both released as soon as interrupter 17 opens the holding circuit for relay 16. While operated, relay 18 also closes a circuit from ground at its left-hand front contact, through the right hand back contact and winding of relay 22; relay 22 is thus operated sufficiently to close a locking circuit from battery through both windings and its left inner front contact, to ground on conductor 19, without opening its operating circuit at its right-hand back contact. The left-hand winding of relay 22 is short-circuited as long as relay 18 is held operated to the ground at interrupter 17; but when relay 18 releases, relay 22 is completely operated by the current through both windings in series. If the called office is in zone 2 no further operation of relay 16 occurs since the booster-battery impulse is terminated at the same time that the holding circuit for relay 16 is opened. But if the called office is in zone 3, 4 or 5 the booster-battery impulse is prolonged to cause a reoperation of relays 16 and 18 for each additional four tenths of a second of the duration of the booster battery impulse. A second operation of relays 16 and 18 is effective to operate zone relay 23, a third operation is effective to operate zone relay 24, and a fourth operation is effective to operate zone relay 25. Any of relays 23, 24 and 25, which are thus operated, lock in a similar manner to that in which relay 22 is locked, to the ground on conductor 19. With none of these zone recording relays operated, the metering switch M will charge the calling subscriber at the zone 1 rate; with only relay 22 operated, the metering switch will charge at the zone 2 rate; with only relays 22 and 23 operated, the metering switch will charge at the zone 3 rate; with only relays 22, 23 and 24 operated, the metering switch will charge at the zone 4 rate; and with all of relays 22, 23, 24 and 25 operated, the metering switch will charge at the zone 5 rate.

The calling subscriber continues to dial all of the digits of the called station's number, the dial impulses being repeated by the repeater R to control the selective operations of the selector S2 and the connector C. The release of relay 61 upon receipt of the first impulse of each train opens the loop across the outgoing conductors of trunk 77, and causes the operation of slow-to-release relay 73. Relay 73 short circuits the lower winding of relay 65 and the upper winding of relay 64 to reduce the loop resistance across the outgoing conductors of trunk 77 during transmission of outgoing impulses, relay 73 being designed to remain operated until all of the impulses in each train have been repeated. Relay 65 may release during impulse transmission but relay 64 is unaffected by the short circuiting of its upper winding. The alternate release and reoperation of relay 61 causes the incoming impulses to be repeated over trunk 77 to operate the selector S2 and connector C. The resistance 74 connected across the back contacts of relay 73 prevents the transmission of a false pulse when relay 73 releases at the end of each train of impulses; and the outer contacts of relay 73 insure that relay 67 will be operated within two seconds after the repeater is seized even though the first impulses are received before relay 67 operates.

When connection with the line 99 of the called station B has been completed and the called subscriber answers, the connector switch functions in the usual manner to reverse the current over the conductors of trunk 77 thereby causing the operation of relay 64. Relay 64 closes a circuit for operating relay 75. Relay 75 reverses the connections between the windings of the line relay 61 and the incoming conductors of trunk 60 so that the current over the talking conductors of trunk T and through the windings of the polarized supervisory relay 30 is also reversed to operate relay 30. With relay 75 operated both windings of relay 65 as well as the upper winding of relay 64 are including in the loop across the outgoing conductors of trunk 77, thereby improving the transmission of talking current through condensers 76 during conversation.

The operation of supervisory relay 30 initiates the operation of the metering switch M by connecting the right-hand winding of relay 31 through the inner right-hand back contact of relay 33, front contact of relay 30, right-hand back contact of relay 31, to the brush of interrupter 32. The brush of interrupter 32 is connected to ground for two seconds out of every four so that the right-hand winding of relay 31 is energized not later than two seconds after relay 30 operates. Relay 31 is not sufficiently energized to open its right-hand back contact, but its left-hand contacts are operated to connect its left-hand winding to the ground on conductor 19. The left-hand winding of relay 31 is short-circuited by the ground at interrupter 32 until the interrupter opens this connection, at which time both windings of relay 31 are energized in series and the remainder of its contacts are thus operated. The complete operation of relay 31 transfers the connection from interrupter 32, to the left-hand back contact and winding of relay 33, so that relay 33 operates as soon as the brush of interrupter 32 is again connected to ground. Relay 33 locks through its inner left-hand front contact to ground on conductor 19, independently of whether relay 30 remains energized; but the initial operation of relay 33 depends upon relay 30 having remained energized from the time that relay 31 was operated until relay 33 operated, this period being in no case less than two seconds. False initiation of the charging operation is thus prevented if supervisory relay 30 is momentarily operated due to a trunk or line busy signal. Relay 33 connects the winding of relay 34 through the inner right-hand front contact of relay 33, front contact of relay 30, outer right-hand front contacts of relays 33 and 15, outer left-hand front contact of relay 33, terminal 1 and brush of bank 39, inner right-hand front contact of relay 15, and through the brush and terminal 1 of bank 38 to the brush of interrupter 17. Relay 34 operates, as soon as interrupter 17 connects ground to its brush, to close an obvious circuit for operating the stepping magnet 35 of the metering switch M. When interrupter 17 opens the ground connection (.2 second after its closure) relay 34 releases. The release of magnet 35 then advances the brushes of banks 36, 37, 38 and 39 to position 2. Relay 34 reoperates, as soon as interrupter 17 again closes the connection to ground, in a circuit from battery through its winding, back contact of magnet 35, terminal 2 and brush of bank 39, right inner front contact of relay 15, through brush 38 to interrupter 17. Relay 34 closes the circuit for operating magnet 35 and magnet 35 opens the circuit for relay 34. The release of relay 34 opens the circuit for magnet 35 and the release of magnet 35 advances the brushes of switch M to position 3 without waiting for interrupter 17 to open the ground connection. Relay 34 immediately reoperates before the ground at interrupter 17 is opened so that magnet 35 reoperates and when the ground connection at interrupter 17 is opened the release of relay 34 and magnet 35 advances the brushes of switch M to position 4; the circuit for operating relay 34 in position 3 is traced from battery through its winding, right inner front contact of relay 33, contacts of relay 30, right outer front contacts of relays 33 and 15, terminal 3 and brush of bank 39, right inner front contact of relay 15, and through the brush and terminal 3 of bank 38, to ground at interrupter 17. Each subsequent closure and opening of the ground connection at interrupter 17 causes the advance of switch M two steps, until the brushes of switch M have been advanced to terminal 11. When the brush of bank 38 leaves terminal 10 and engages terminal 11 the operating circuit of relay 34 is transferred through brush 38 from interrupter 17 to interrupter 47. Interrupter 47 closes a ground connection for approximately half a second out of every thirty seconds; so that the brushes of switch M are now advanced at the rate of one terminal every half minute until terminal 22 is reached. Terminal 22 of bank 38 is connected to ground at the right-hand back contact of relay 44, so that relay 34 and magnet 35 are operated immediately but relay 34 is now held operated through the front contact of magnet 35 and brush 38 to the same ground. Relay 44 operates in a circuit from battery through its winding, terminal 22 and brush of bank 39, right inner front contact of relay 15, brush and terminal 22 of bank 38, to ground at the right-hand back contact of relay 44. The right-hand inner front contacts of relay 44 close before the right-hand back contact is opened so that relay 44 locks to ground on conductor 19. Relay 44 then opens the circuit for relay 34 and the release of relay 34 releases magnet 35 to advance the brushes of switch M to normal.

If conversation has not been completed by the end of the initial unit period of conversation, supervisory relay 30 has not released and the foregoing cycle of advancing the metering switch M is repeated. On the initial revolution it is necessary that the switch advance from terminal 21 to 22 under control of interrupter 47 in order that an immediate closure when the switch enters position 11 will not reduce the length of the initial conversation period. But on succeeding cycles the switch is advanced immediately from terminal 21 to terminal 22 without waiting for the ground at interrupter 47, the circuit for operating stepping relay 34 being traced through brush 37 and the inner right front contact of relay 44 to ground on conductor 19.

To prevent switch M from being advanced more than one step for each closure of interrupter 17 or 47, stepping relay 34 is held operated in each position through the front contact of magnet 35, until the interrupter opens the ground connection. This arrangement prevents undercharging or overcharging in case the supervisory relay 30 is temporarily released after the call has been answered due to the receiver hook being moved up and down at either the calling or the called stations.

During the advance of the switch M from position 1 to position 11 of each revolution, the message register of the calling station is operated the proper number of times as a charge for one unit period of conversation. During the advance of the switch from position 11 to position 21 the switch M measures the unit period for which the charge has been made. The number of register operations and the length of a conversation period may be varied according to the zone in which the called station is located and also according to whether the charge is for the initial or a subsequent period of conversation. The various terminal connection arrangements by which the metering switch M may be adapted to the required plan of message-rate charges in different telephone areas will now be explained. The following table gives six of the many possible plans for areas having five charging zones:

| Plan | Zone | Initial operations of meter | Initial time period | Subsequent operations of meters | Subsequent time periods |
|---|---|---|---|---|---|
| | | | *Min.* | | *Min.* |
| 1 | 1 | 1 | 5 | 1 | 5 |
| | 2 | 2 | 5 | 2 | 5 |
| | 3 | 3 | 5 | 3 | 5 |
| | 4 | 4 | 5 | 4 | 5 |
| | 5 | 5 | 5 | 5 | 5 |
| 2 | 1 | 1 | 5 | 1 | 5 |
| | 2 | 2 | 5 | 1 | 5 |
| | 3 | 3 | 5 | 1 | 5 |
| | 4 | 4 | 5 | 1 | 5 |
| | 5 | 5 | 5 | 1 | 5 |
| 3 | 1 | 1 | 5 | 1 | 5 |
| | 2 | 2 | 5 | 1 | 3 |
| | 3 | 3 | 5 | 1 | 2 |
| | 4 | 4 | 5 | 1 | 2 |
| | 5 | 5 | 5 | 1 | 1 |
| 4 | 1 | 1 | 5 | 1 | 5 |
| | 2 | 2 | 5 | 1 | 2½ |
| | 3 | 3 | 5 | 1 | 2½ |
| | 4 | 4 | 5 | 1 | 1½ |
| | 5 | 5 | 5 | 1 | 1½ |
| 5 | 1 | 1 | 5 | 1 | 5 |
| | 2 | 2 | 5 | 1 | 2½ |
| | 3 | 3 | 5 | 1 | 1½ |
| | 4 | 4 | 5 | 2 | 2½ |
| | 5 | 5 | 5 | 2 | 1½ |
| 6 | 1 | 1 | 5 | 1 | 5 |
| | 2 | 2 | 5 | 1 | 3 |
| | 3 | 3 | 3 | 1 | 1 |
| | 4 | 4 | 3 | 1 | 1 |
| | 5 | 5 | 3 | 1 | 1 |

We will first assume that the trunk T is arranged for charging according to plan 1. In this case, the terminals of bank 37 of the metering switch M are connected as shown in Fig. 1, with conductors 26, 27, 28 and 29 left unconnected, except that the left armature and back contact of relay 44 are strapped together. As soon as switch M enters position 2 of its initial revolution, relay 43 is operated by the ground connected to terminal 2 of bank 36. Relay 43 transfers conductor 14 from ground to booster-battery through resistance 42 and lamp 41 so as to cause one operation of the message register 4 of the calling station; the cut-off relay 3 and the line finder LF are held by this booster-battery impulse. Relay 43 and register 4 release when the switch is advanced to position 3. If the called station is in zone 1 no further operations of relay 43 and register 4 occur during the initial conversation period as measured by the revolution of switch M. But if the call is to one of zones 2, 3, 4 or 5, the operation of one or more of zone relays 22, 23, 24 and 25 has connected ground to the corresponding one or more of terminals 4, 6, 8, and 10 of bank 36; so that the advance of switch M causes the reoperation of relay 43 to cause either one, two, three or four additional operations of register 4 depending upon the zone in which the called station is located. As hereinbefore mentioned relay 44 operates at the end of the first revolution and since the left armature and back contact of relay 44 are strapped together, the number of meter operations for each additional revolution of switch M is the same as the number of operations for the initial revolution. And since conductors 26, 27, 28 and 29 are not connected, subsequent revolutions of switch M are made in the same length of time (5 minutes) as the first revolution.

If the trunk T is arranged for charging according to plan 2, the left armature and back contact of relay 44 are not strapped together the wiring being exactly as shown in Fig. 1, the conductors 26, 27, 28 and 29 being left unconnected. In this case, the meter operations for the initial revolution of switch M are the same as for a similar call if the trunk T were arranged according to plan 1; but the operation of relay 44 at the end of the first revolution disconnects ground from conductor 45 to prevent more than one operation of the register 4 for each additional unit period of conversation irrespective of the zone within which the called station is located.

If the trunk T is arranged for charging according to plan 3, conductors 26, 27, 28 and 29 are connected to the terminals of bank 37 as shown in Fig. 3, the remainder of the wiring being as shown in Fig. 1. In this case the number of register operations for both the initial and subsequent revolutions of switch M are identical with those for corresponding calls when the trunk T is arranged to charge according to plan 2 but the length of each additional period of conversation is variably reduced according to the zone in which the called station is located. Thus on a call to zone 2 the operation of relay 44 at the end of the first revolution connects ground over conductor 46, through the outer left front contact of relay 22, over conductor 26, to terminals 17 to 20 inclusive of bank 37. Stepping relay 34 and magnet 35 are thereby operated to advance switch M past these terminals without waiting for the ground closures at interrupter 47; therefore, an additional charge is made for every 3 minutes of conversation after the initial period of 5 minutes. On a call to zone 3, the ground on conductor 46 (after the initial revolution of switch M) is connected to terminals 17 to 20 inclusive of bank 37 as on a call to zone 2, and also through the left outer back contact of relay 24 and left outer front contact of relay 23, over conductor 27 to terminals 15 and 16 of bank 37 so that switch M is advanced without delay from terminal 15 to terminal 21; therefore, an additional charge is made for every two minutes of conversation. On a call to zone 4, the ground on conductor 46 is connected to terminals 15 to 20 inclusive and the additional unit periods of conversation are the same as on a call to zone 2 except that the connection from conductor 46 to terminals 15 and 16 is traced through the left outer front contact of relay 24 over conductor 28. On a call to zone 5, the ground on conductor 46 is connected to terminals 15 to 20 inclusive as on a call to zone 4 and is also connected through the left outer front contact of relay 25 over conductor 29 to terminals 13 and 14; therefore switch M is advanced without delay from terminal 13 to terminal 21 so that the unit period of conversation after the initial period is reduced to 1 minute.

If the trunk T is arranged for charging according to plan 4, conductors 26, 27, 28 and 29 are connected as shown in Fig. 4, the remainder of the wiring being as shown in Fig. 1. This arrangement causes switch M to advance without delay on the second and succeeding revolutions from terminal 16 to terminal 21 if the called station is located in zone 2 or 3 and to advance without delay from terminal 14 to terminal 21 on calls to zones 4 or 5, the connections from ground on conductor 46 for operating stepping relay 34 being controlled by zone relays 22, 23, 24 and 25 in an obvious manner. Thus the initial unit period of conversation is 5 minutes on all calls, successive unit periods being 2½ minutes for calls to zones 2 and 3 and 1½ minutes for calls to zones 4 and 5.

If the trunk T is arranged for charging according to plan 5, conductors 26, 27, 28 and 29 are connected as shown in Fig. 5, the remainder of the wiring being as shown in Fig. 1 except that the outer right-hand front contact of relay 24 is connected directly to ground instead of being connected to conductor 45. This arrangement causes switch M to advance without delay on the second and succeeding revolutions, from terminal 16 to terminal 21 if the called station is located in zone 2 or 4 and to advance without delay from terminal 14 to terminal 21 if the called station is located in zone 3 or 5; the connections from ground on conductor 46, for operating stepping relay 34 are controlled by relays 22, 23, 24 and 25 in an obvious manner. Thus the initial unit period of conversation is 5 minutes on all calls, successive unit periods being 5 minutes for calls to zone 1, 2½ minutes for calls to zones 2 and 4, and 1½ minutes for calls to zones 3 and 5. Since the outer right-hand front contact of relay 24 is connected directly to ground, each charge after the initial charge, on calls to zones 4 and 5 consists of two operations of register 4.

If the trunk T is arranged for charging according to plan 6, conductors 26, 27, 28 and 29 are connected as shown in Fig. 6, the remainder of the wiring being as shown in Fig. 1 except that the outer left-hand armature of relay 24 is connected directly to ground instead of being connected to conductor 46. This arrangement causes switch M to advance without delay on the initial revolution from terminal 13 to terminal 17 on calls to zones 3, 4 and 5 thus reducing the initial unit period of conversation to 3 minutes. It also causes switch M to advance without delay on the second and succeeding revolution from terminal 17 to terminal 21 if the called station is located in zone 2 and from terminal 13 to terminal 21 if the called station is located in either of zones 3, 4 or 5. The connections for operating stepping relay 34 are controlled by relays 22, 23, 24 and 25 in an obvious manner. Thus the initial unit period of conversation is five minutes on calls to zones 1 and 2, and is 3 minutes on calls to zones 3, 4 and 5. The second and each succeeding unit period of conversation is 5 minutes on a call to zone 1, 3 minutes on a call to zone 2, and one minute on a call to zones 3, 4 or 5.

When the connection is released by the subscriber at the calling station, the line relay 61 of repeater R releases, thereby opening the loop across the outgoing conductors of trunk 77 so as to release relays 64 and 65 of repeater R and the line relay (not shown) of the connector C. The connector C is restored to normal in the usual manner. When the connector C removes ground from the incoming sleeve conductor, selector S2 is released and returned to normal in the usual manner. The release of relay 61 also causes the release of relay 62, whereby the holding ground is disconnected from conductor 63 so as to cause the release of relay 69 and the release of relay 15 of trunk circuit T. The release of relay 64 causes the release of relay 75 so that the repeater R is now ready for another call.

The release of relay 15 disconnects ground from conductor 19 so as to cause the release of relays 31, 33, 44 and any of the zone relays 22, 23, 24 and 25 which were operated. The release of relay 15 also disconnects the ground on conductor 14 from the sleeve brush 13 of line finder LF so as to cause the release of the cut-off relay 3 and the return of the line finder to normal. Relay 15 also causes the return of switch M to its normal position by closing a circuit for operating stepping relay 34. With switch M in any of positions 2, 4, 6, 8 or 10 the circuit for operating relay 34 may be traced from battery through its winding, back contact of magnet 35, conductor 48, terminal and brush of bank 39, to ground at the inner right-hand back contact of relay 15. With the switch in any of positions 3, 5, 7, 9 or 11 to 21 inclusive, the operating circuit for stepping relay 34 may be traced from its winding, through the back contact of magnet 35, outer right-hand back contact of relay 15, terminal and brush of bank 39, to ground at the inner right-hand back contact of relay 15. In each position the operation of relay 34 causes the operation of magnet 35. The operation of magnet 35 opens the operating circuit for relay 34 so that relay 34 and magnet 35 are thus alternately operated and released to advance the brushes of switch M until they reach position 22. In position 22, relay 44 reoperates and the circuit for operating relay 34 is traced from conductor 48, through the brush and terminal of bank 37, right inner front contact of relay 44, terminal 22 and brush of bank 39, to ground at the inner right-hand back contact of relay 15. The switch M is thus returned to its normal position, and relay 44 again releases as soon as the brush of bank 39 leaves terminal 22. The entire trunk circuit T is now normal, ready for service on another call.

What is claimed is:

1. In a telephone system, subscribers' lines, an automatic switch, means including a trunk for extending a calling line to said switch, a message register for said calling line, control means for variably operating said register in accordance with the destination and duration of a call, means including another trunk for further extending the connection from said calling line to a called line, and means associated with and effective upon seizure of said other trunk for varying said control means in accordance with the destination of the call.

2. In a telephone system, subscribers' lines, an automatic switch, means for extending a calling line to said switch, a message register for said calling line, control means for variably operating said register in accordance with the destination of the call, means including a trunk for completing the connection to a called line, and means associated with said trunk for transmitting a current impulse to said control means, the duration of said impulse being indicative of the destination of the call.

3. In a telephone system, subscribers' lines, an automatic switch, means including a trunk for extending a calling line to said switch, a message register for said calling line, control means individual to said trunk for variably operating said register, means including another trunk for further extending the connection from said calling line to a called line, and means associated with and effective upon seizure of said other trunk for varying said control means in accordance with the destination of the call.

4. In a telephone system, subscribers' lines, an automatic switch, means including a trunk for extending a calling line to said switch, a message register for said calling line, control means for variably operating said register, means including an outgoing trunk repeater for completing a connection to a called line, and means associated with said repeater for transmitting a current impulse to said control means the duration of said impulse corresponding to the destination of the call.

5. In a telephone system, subscribers' lines, an automatic switch, means including a trunk for extending a calling line to said switch, a message register for said calling line, control means individual to said trunk for variably operating said register, means including an outgoing trunk repeater for completing the connection to a called line, and means associated with said repeater for transmitting a current impulse to said control means the duration of said impulse corresponding to the destination of the call.

6. In a telephone system, subscribers' lines divided into a plurality of zones, an automatic switch, means including a trunk for connecting a calling line to said switch, a meter for said calling line, control means for variably operating said meter in accordance with the destination and duration of a call, an interoffice trunk for further extending the connection from said calling line to another of said lines in a different zone, and means associated with said interoffice trunk and effective immediately upon seizure of said interoffice trunk for varying said control means in accordance with the zone in which said called line is located.

7. In a telephone system, subscribers' lines divided into a plurality of zones, an automatic switch, means including a trunk for connecting a calling line to said switch, a meter for said calling line, control means individual to said trunk for variably operating said meter, an interoffice trunk for further extending the connection from said calling line to another of said lines in a different zone, and means associated with said interoffice trunk and effective immediately upon seizure of said interoffice trunk for varying said control means in accordance with the zone in which said called line is located.

8. In a telephone system, subscribers' lines divided into a plurality of zones, an automatic switch, means including a trunk for connecting a calling line to said switch, a meter for said calling line, control means for variably operating said meter, means including a repeater for further extending the connection from said calling line to another of said lines in a different zone, and means associated with said repeater for transmitting a current impulse to said control means the duration of said impulse being indicative of the zone in which said called line is located.

9. In a telephone system, subscribers' lines divided into a plurality of zones, an automatic switch, means including a trunk for connecting a calling line to said switch, a meter for said calling line, control means individual to said trunk for variably operating said meter, means including a repeater for further extending the connection from said calling line to another of said lines in a different zone, and means associated with said repeater for transmitting a current impulse to said control means the duration of said impulse being indicative of the zone in which said called line is located.

10. In a telephone system, subscribers' lines divided into a plurality of zones, means including a trunk and an outgoing interoffice repeater for extending a connection from a calling line in one of said zones to a called line in a different zone, a meter for said calling line, control means associated with said trunk including a timing switch for measuring an initial unit period of conversation and for measuring additional unit periods of conversation, zone relays individual to said trunk for varying the number of meter operations per cycle of said timing switch according to the zone within which the called station is located and including means for operating said meter, and means associated with said repeater for transmitting an impulse whose duration is indicative of the zone within which the called station is located to operate the corresponding one or more of said zone relays.

11. In a telephone system, subscribers' lines divided into a plurality of zones, means including a trunk and an outgoing interoffice repeater for extending a connection from a calling line in one of said zones to a called line in a different zone, a meter for said calling line, control means associated with said trunk including a timing switch for measuring an initial unit period of conversation and for measuring additional unit periods of conversation, zone relays individual to said trunk for varying the length of a unit period of conversation according to the zone within which the called station is located and including means for operating said meter, and means associated with said repeater for transmitting an impulse whose duration is indicative of the zone within which the called station is located to operate the corresponding one or more of said zone relays.

12. In a telephone system, subscribers' lines divided into a plurality of zones, means including a trunk and an outgoing interoffice repeater for extending a connection from a calling line in one of said zones to a called line in a different zone, a meter for said calling line, control means associated with said trunk including a timing switch for measuring an initial unit period of conversation and for measuring additional unit periods of conversation, zone relays individual to said trunk for varying the number of meter operations per cycle of said timing switch and for varying the length of a unit period of conversation according to the zone within which the called station is located and including means for operating said meter, and means associated with said repeater for transmitting an impulse whose duration is indicative of the zone within which the called station is located to operate the corresponding one or more of said zone relays.

13. In a telephone system, subscribers' lines, an automatic switch, means including a trunk for extending a calling line to said switch, a message register for said calling line, control means for variably operating said register in accordance with the destination and duration of a call, means including another trunk for further extending the connection from said calling line to a called line, and means associated with said other trunk for transmitting a current impulse to said control means, the duration of said impulse being indicative of the destination of the call.

14. In a telephone system, subscribers' lines, an automatic switch, means including a trunk for extending a calling line to said switch, a message register for said calling line, control means individual to said trunk for variably operating said register, means including another trunk for further extending the connection from said calling line to a called line, and means associated with and immediately effective upon seizure of said other trunk for varying said control means in accordance with the destination of the call.

15. In a telephone system, subscribers' lines, an automatic switch, means including a trunk for extending a calling line to said switch, a message register for said calling line, control means individual to said trunk for variably operating said register, a second trunk for further extending the connection from said calling line, and means individual to said second trunk and immediately effective upon seizure of said second trunk for setting said control means in accordance with destination of the call.

16. In a telephone system, subscribers' lines, an automatic switch, means including a trunk for extending a calling line to said switch, a message register for said calling line, control means individual to said trunk for variably operating said register in accordance with the destination and duration of a call, means including another trunk for further extending the connection from said calling line to a called line, and means individual to said other trunk for transmitting a current impulse to said control means, the duration of said impulse being indicative of the destination of the call.

17. In a telephone system, subscribers' lines, an automatic switch, means for extending a calling line to said switch, a message register for said calling line, control means for variably operating said register in accordance with the destination and duration of the call, means including an outgoing trunk for completing the connection to a called line, and means individual to said trunk for transmitting a current impulse to said control means, the duration of said impulse being indicative of the destination of the call.

18. In a telephone system, subscribers' lines, an automatic switch, means including a trunk for extending a calling line to said switch, a message register for said calling line, control means for variably operating said register in accordance with the destination and duration of a call, means including an outgoing repeater for completing the connection to a called line, and means associated with said repeater for transmitting a current impulse to said control means the duration of said impulse corresponding to the destination of the call.

19. In a telephone system, subscribers' lines, an automatic switch, means including a trunk for extending a calling line to said switch, a message register for said calling line, control means individual to said trunk for variably operating said register in accordance with the destination and duration of a call, means including an outgoing repeater for completing the connection to a called line, and means associated with said repeater for transmitting a current impulse to said control means the duration of said impulse corresponding to the destination of the call.

20. In a telephone system, subscribers' lines, an automatic switch, means including a trunk for extending a calling line to said switch, a message register for said calling line, control means individual to said trunk for variably operating said register in accordance with the destination and duration of a call, a second trunk for further extending the connection from said calling line, and means associated with said second trunk and immediately effective upon seizure of said second trunk for setting said control means in accordance with the destination of the call.

21. In a telephone system, subscribers' lines divided into a plurality of zones, an automatic switch, means including a trunk for connecting a calling line to said switch, a meter for said calling line, control means individual to said trunk for variably operating said meter in accordance with the destination and duration of a call, an interoffice trunk for further extending the connection from said calling line to another of said lines in a different zone, and means associated with said interoffice trunk and effective immediately upon seizure of said interoffice trunk for varying said control means in accordance with the zone in which said called line is located.

22. In a telephone system, subscribers' lines divided into a plurality of zones, an automatic switch, means including a trunk for connecting a calling line to said switch, a meter for said calling line, control means for variably operating said meter in accordance with the destination and duration of a call, means including an outgoing trunk repeater for further extending the connection from said calling line to another of said lines in a different zone, and means associated with said repeater for transmitting a current impulse to said control means, the duration of said impulse being indicative of the zone in which said called line is located.

23. In a measured service telephone system wherein automatic switches are operated in accordance with dialed digits to set up and complete talking connections between subscribers' lines, a switch, a switchbank and wipers for said switch, means for variably marking the switchbank of said switch in accordance with certain of the digits employed in setting up a connection, means for continuously operating the wipers of said switch during the talking period of an established connection to wipe over said switchbank, and means controlled by the operation of the wiper of said switch for transmitting a different number of metering impulses in accordance with each variable marking in said switchbank.

24. In a measured service telephone system wherein automatic switches are operated to set up and complete talking connections between subscribers' lines located in different zones, an impulse sender associated with one of said automatic switches, said one automatic switch set in a position corresponding to the zone a called subscriber's line is located in, means for continuously operating said sender during the talking period of an established connection, and means controlled by the operation of said sender for transmitting a number of metering impulses in accordance with the setting of said associated switch.

25. In a measured service telephone system wherein automatic switches are operated in accordance with digits dialed by a calling subscriber to set up and complete talking connections between subscriber's lines, a switch permanently connected to one of said automatic switches included in the talking connection, a switchbank and wipers for said switch, means for variably marking the switchbank of said switch in accordance with the digit used to set said one automatic switch, means for continuously operating the wipers of said switch during the talking period of an established connection to wipe over said switchbank, and means controlled by the operation of the wipers of said switch for transmitting a different number of metering impulses in accordance with each variable marking in said switchbank.

26. In a measured service telephone system wherein automatic switches are operated to set up and complete talking connections between subscribers' lines, an impulse sender associated with one of said automatic switches included in the talking connection, a metering circuit, a rotary switch including a wiper and bank contacts therefor in said sender, means for continuously operating said wiper over its bank contacts during the talking period of an established connection, a set of relays for variably marking the contacts in said switchbank to determine the number of metering impulses to be transmitted over said metering circuit, and a relay operated over said wiper and the marked contacts responsive to the operation of said wiper for transmitting metering impulses over said metering circuit in accordance with the variable marking of said bank contacts by said set of relays.

27. In a measured service telephone system wherein a series of automatic switches are operated to set up and complete a talking connection between a calling and a called line, a wiper on one of said automatic switches operated during the setting up of said connection to a position corresponding to the zone the called line is located in, an impulse sender associated with said one automatic switch, means for continuously operating said sender during the talking period of the established connection, a metering circuit, and means controlled by the operation of said sender for transmitting a predetermined number of metering impulses over said metering circuit dependent upon the position said wiper is operated to in setting up said connection.

RAY L. STOKELY.